United States Patent
Oliver et al.

(10) Patent No.: US 6,263,779 B1
(45) Date of Patent: Jul. 24, 2001

(54) SNAP RING CLOSURE SYSTEM

(75) Inventors: Michael Leslie Oliver, Xenia; Patrick Neil Hopkins, West Carollton; Ilya Lisenker, Miamisburg; William Charles Kruckemeyer, Beavercreek, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/412,266

(22) Filed: Oct. 5, 1999

(51) Int. Cl.$^7$ .................................................. F01B 29/00
(52) U.S. Cl. .............................................. 92/128; 92/165 R
(58) Field of Search .................................. 92/128, 165 R

(56) References Cited

U.S. PATENT DOCUMENTS

| | | |
|---|---|---|
| 2,478,818 | 8/1949 | Geiger et al. . |
| 2,619,717 | 12/1952 | Gober . |
| 2,890,917 * | 6/1959 | Prince ................. 92/165 R |
| 3,070,127 * | 12/1962 | Gratzmuller ............ 138/31 |
| 3,334,937 * | 8/1967 | Jofeh .................. 92/128 X |
| 3,494,652 | 2/1970 | Langland ................. 92/128 |
| 3,650,182 | 3/1972 | Phillips ................... 92/128 |
| 4,077,232 * | 3/1978 | Grosseau ................ 464/269 |
| 4,225,263 * | 9/1980 | Asberg .................. 403/326 |
| 4,321,987 | 3/1982 | Dressell, Jr. et al. . |
| 4,924,758 * | 5/1990 | Yuda ........................ 92/128 |
| 5,070,767 * | 12/1991 | Yuda ........................ 92/128 |
| 5,117,743 * | 6/1992 | Yuda ........................ 92/128 |
| 5,357,847 | 10/1994 | Stewart .................... 92/128 |
| 5,487,326 | 1/1996 | Owens ..................... 92/128 |
| 5,553,378 | 9/1996 | Parekh et al. . |
| 5,651,303 | 7/1997 | Fish . |
| 5,680,808 * | 10/1997 | Day et al. ................ 92/168 |
| 5,778,760 | 7/1998 | Yuda . |
| 6,101,922 * | 8/2000 | King ........................ 92/164 |

FOREIGN PATENT DOCUMENTS

| 220321 | * | 9/1973 | (DE) . |
| 45-7613 | * | 6/1964 | (JP) . |

* cited by examiner

Primary Examiner—John E. Ryznic
(74) Attorney, Agent, or Firm—Robert M. Sigler

(57) ABSTRACT

A snap ring closure system is particularly useful in securing a rod guide in an end of a tube of a hydraulic damper. The snap ring closure system utilizes an end cap or rod guide having a double-lobed groove and a peripheral flange about its outer end. The double-lobed groove includes an outer lobe and an inner lobe of a lesser depth than the outer lobe. A groove is formed on the tube and is positioned to design with the doubled-lobed groove when the end cap is inserted in the tube. The end cap includes a first snap ring in the outer lobe which expands outwardly into the tube groove when the cap is first inserted. The cap is secured by engagement of the first snap ring with the inner more shallow lobe. A second snap ring is placed between the flange and the end of the tube to remove any play between the end cap and tube.

10 Claims, 3 Drawing Sheets

SNAP RING CLOSURE SYSTEM

TECHNICAL FIELD

The present invention is directed to closures, and more particularly to blind closures for retaining end caps or rod guides in hydraulic dampers.

BACKGROUND

Shocks, struts and other dampers, generally known as hydraulic dampers or monotube dampers, typically are used in vehicle shock absorbing systems to dissipate vibrational, shock and other forces applied to the wheel assemblies of motorized vehicles. Such dampers typically operate by transmitting the forces that are sustained by the wheel assemblies to a rod/piston combination. The rod/piston is slidably mounted in a fluid-filled chamber in the damper. As the piston is urged through the chamber, the hydraulic fluid in the chamber is forced through and around the piston. The movement of fluid through and around the piston resists movement of the piston with a force directly proportioned to the force sustained by the wheel assembly. In this manner vibrational and shock forces applied to an associated wheel assembly are dampened.

Hydraulic dampers of this type typically include a cylinder that is sealed by an end cap at one end and include a rod guide assembly at the other end. The rod guide assembly guides and centers the rod and piston as they reciprocate within the cylinder. While the end cap generally can be welded to the cylinder, the rod guide must be secured in the cylinder after the hydraulic fluid and piston assembly are installed in the cylinder.

Accordingly, in order to insure that hydraulic fluid does not leak from a hydraulic damper, it is desirable for a rod guide to be secured in a fluid-tight relationship with the cylinder. Additionally, due to the above-mentioned design constraints with the damper, it is desirable for the rod guide to be secured in a "blind" configuration, meaning that access to the underside of the rod guide is not required in order to secure the rod guide into the end of the cylinder. While blind fastening devices are useful in many applications, they are particularly useful in sealed hydraulic fluid applications, such as the above described hydraulic dampers, for a variety of reasons. In particular, access to the underside of the rod guide can be difficult due to the relatively long length and narrow diameter of the cylinder. Furthermore, after the hydraulic fluid has been dispensed into the cylinder, access to the underside of the rod guide becomes extremely difficult.

Prior art closure methods and devices have used blind snap ring closures in hydraulic damper applications with some success. For example, U.S. Pat. No. 3,650,182 to Phillips discloses the use of a snap ring closure apparatus for securing a piston rod bearing into a cylindrical barrel. However, that snap ring closure apparatus uses only a single snap ring to secure the bearing into the barrel. Thus, all of the movement of the bearing inward and outward of the barrel is prevented by a single snap ring, thereby placing a large amount of stress on this single element. Furthermore, the design of that snap ring is such that the snap ring needs to be compressed and fitted into a groove in the barrel after insertion of the bearing, but before the bearing is moved into final position. This can be a difficult procedure to accomplish effectively since the assembly requires holding the bearing in place with one hand while compressing and installing the snap ring with the other hand. Additionally, a great deal of pressure (either hydraulic or mechanical) is necessary to "force" the bearing onto the snap ring. Thus, the assembly of a hydraulic damper using such snap ring devices can be difficult and time consuming.

Another type of snap ring closure is disclosed in U.S. Pat. No. 3,494,652 to Langland. That snap ring closure uses two snap rings and a retainer ring to secure the hydraulic damper head in the cylindrical sleeve. While the configuration of that snap ring closure does distribute the stress created by the movement of the head over more than one snap ring, it also requires a relatively complex assembly. In particular, the first snap ring must be forced into a groove in the sleeve after insertion of the head but prior to completion of the assembly. Then, once the head is moved into contact with the snap ring, a retainer ring must be placed adjacent to a beveled edge of the sleeve and a second snap ring must be secured in a groove in the head into an interference fit with the retainer ring.

Accordingly, three separate assembly operations are required to secure the head in the sleeve using such closure systems. Furthermore, while the second snap ring used in that retainer ring against the beveled edge of the cylindrical sleeve absorbs some of the stress from the movement of the head outward of the cylinder, it does not create a seal that is as strong as might be desired or could be achieved if the force were received by a flange that was integral with the head.

Thus, given the disadvantages of prior art blind closures, there is a need for a blind closure useful in hydraulic damper applications that is relatively easy and simple to secure, and relatively easy to fabricate.

SUMMARY OF THE INVENTION

The present invention is a snap ring closure system suitable for use in a vehicle damping system, particularly for securing a rod guide, or in some instances an end cap, in a hydraulic damper or shock absorber. The snap ring closure system consists of a cylindrical rod guide or end cap having an annular, double-lobed groove formed about its outer circumference and a flange located at an outer end thereof, and a cylinder for receiving the rod guide, having an annular groove formed in the inner circumference thereof, which is aligned with the double-lobed groove. The closure system includes two snap rings. The first snap ring is slightly oversized and is seated in the double-lobed groove in the cylindrical rod guide. The second snap ring is positioned between the flange and the top of the cylinder.

The lobes of the double-lobed groove are of varying depths, with the outer lobe (closer to the flange) having a greater depth than the inner lobe. The first snap ring initially is positioned in the outer (deeper) lobe of the double-lobed groove, so that when the rod guide is initially inserted and pressed into the cylinder, the first snap ring is moved fully into the outer lobe, thereby providing sufficient clearance with the cylinder and is prevented from outward expansion by the walls of the cylinder. Then, when the first snap ring reaches the annular groove in the cylinder wall, the first snap ring expands outwardly into the annular groove.

The rod guide is then pulled slightly outwardly until the first snap ring contacts the bottom face of the second (shallower) lobe of the double-lobed groove, thereby preventing further outward movement of the rod guide from the cylinder. Finally, the second snap ring is positioned between the top edge of the cylinder and the rod guide flange. The second snap ring is positioned on the underside of the rod guide flange and prevents inward movement of the rod guide, thereby maintaining the locking engagement between the first snap ring and the cylinder groove. In this manner, the rod guide is secured to the end of the cylinder.

Accordingly, it is an object of the present invention to provide a snap ring closure system, particularly useful in securing the rod guide or end cap to a cylinder in hydraulic damper applications; a closure system that is relatively easy and simple to secure; that is relatively easy to fabricate and is durable; a closure system that provides a strong seal and prevents fluid leakage; and a closure system that is inexpensive to assemble.

DESCRIPTION OF THE PREFERRED EMBODIMENT

Figure 1:
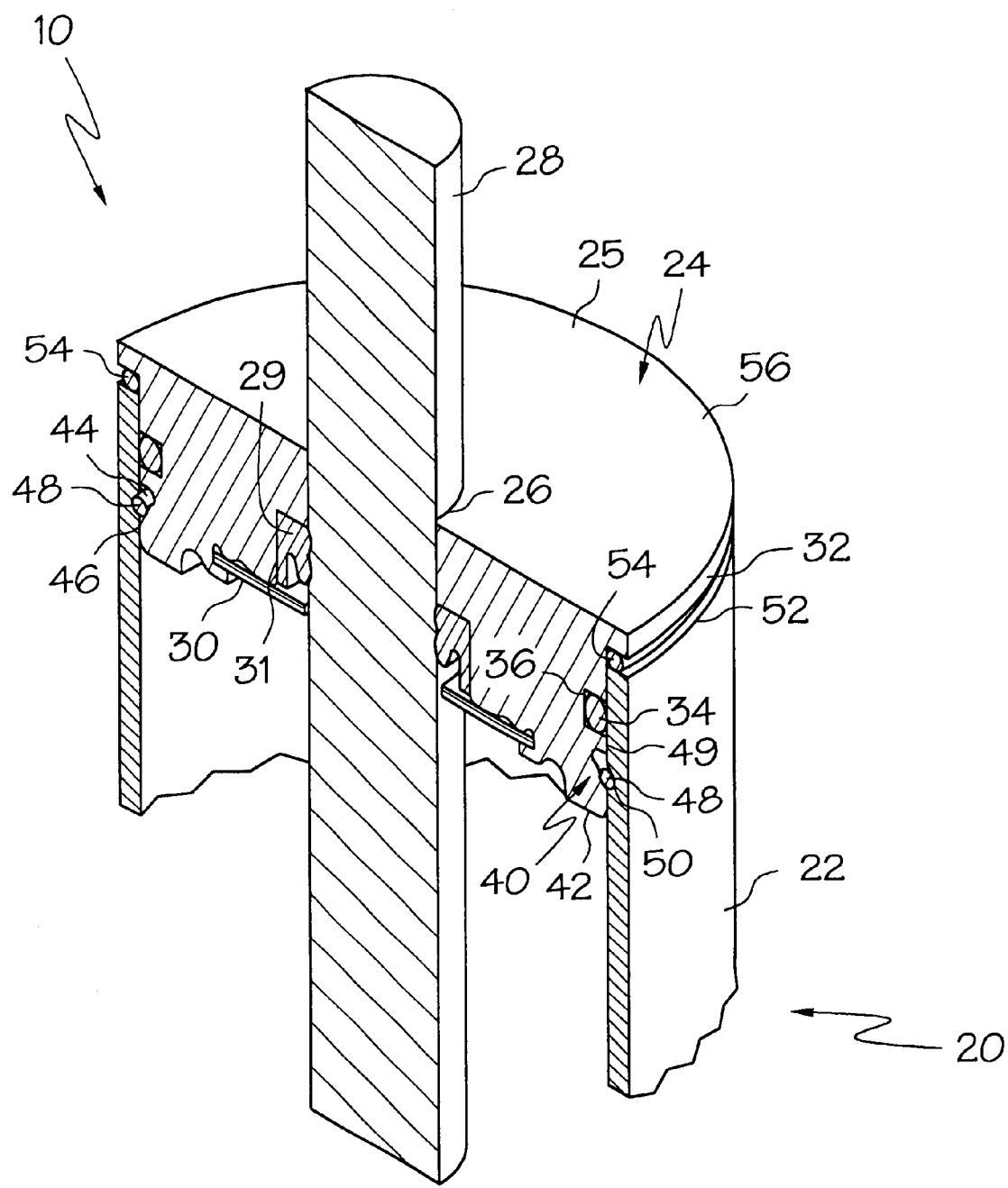
FIG. 1 is a perspective view in section of a hydraulic damper incorporating a preferred embodiment of the snap ring closure system of the present invention.
Figure 2:
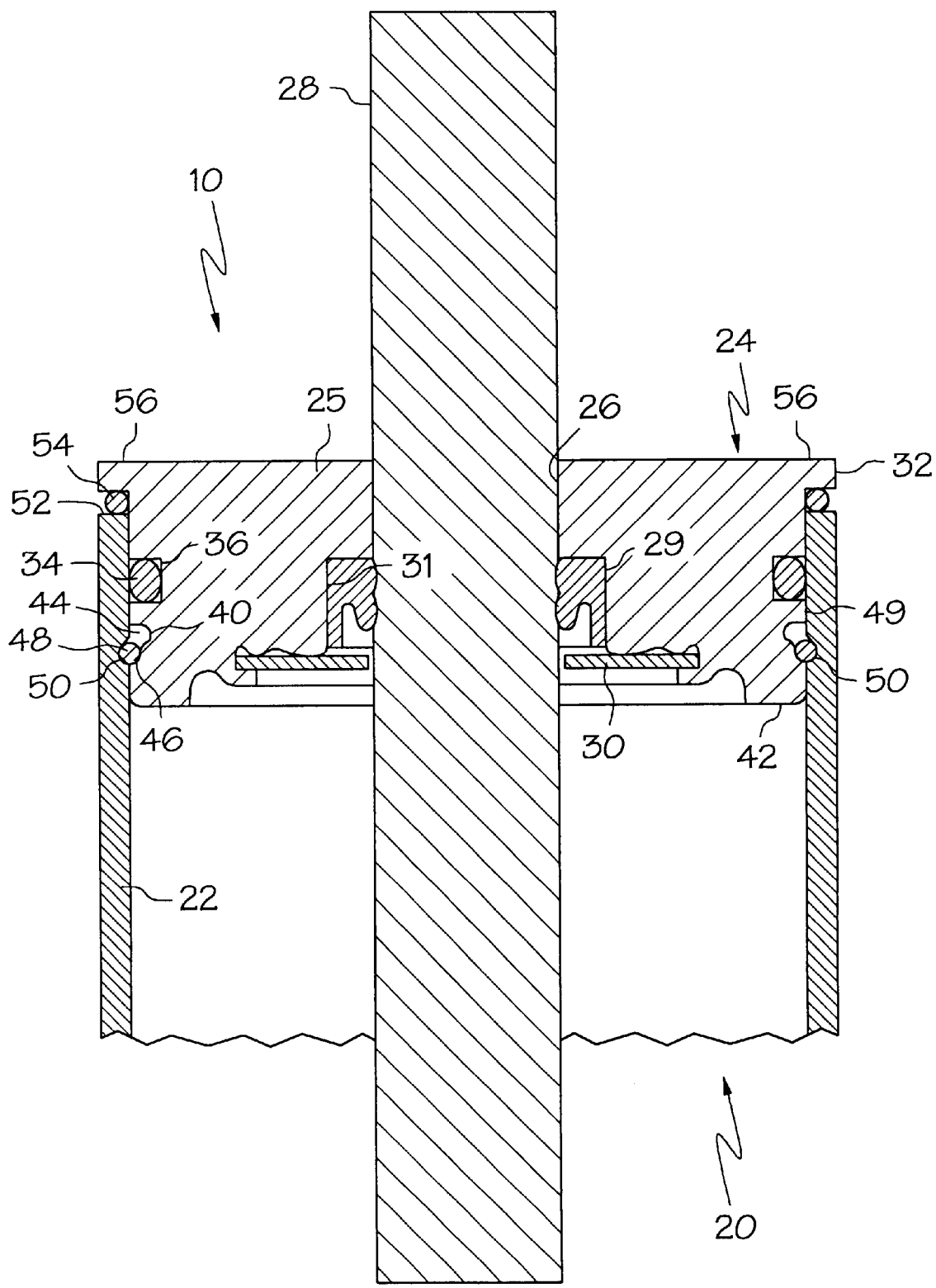
FIG. 2 is a side elevation in section of the snap ring closure system of FIG. 1.

As shown best in FIGS. 1 and 2, a preferred embodiment of the snap ring closure system 10 of the present invention is incorporated in a hydraulic damper 20. However, the snap ring closure system 10 of the present invention may be used in a variety of applications beyond hydraulic dampers, shock absorbers, or struts, and the embodiment shown in FIGS. 1 and 2 is illustrative of a single application only. The hydraulic damper 20 includes a cylinder 22 and a rod guide assembly 24. The rod guide assembly 24 is shaped to be inserted into and received by the cylinder 22 and includes a rod guide or end cap 25 having a central bore 26 for receiving a piston rod 28 axially therethrough. A rod seal 29 is seated in a counterbore 31 and seals the rod 28 relative to the hydraulic fluid-filled interior of the cylinder 22. The inner end of the rod 28 is attached to a piston (not shown). The rod guide 25 is generally cylindrical in shape and includes a radially-extending flange 32 located on its outer end. The rod guide assembly 24 also includes an outer seal 34, such as an O-ring, seated in an outer annular recess 36 formed in the rod guide 25. The seal 34 prevents the leakage of fluid from the interior of the cylinder 22.

The rod guide assembly 24 guides the relative movement of the piston rod 28 through the rod seal 30 and into the cylinder 22. The piston rod 28 is operatively connected to, for example, a vehicle wheel assembly. The piston rod 28 and piston are displaced in response to shock loads sustained by the vehicle wheel assembly, translated through the cylinder 22 to the hydraulic fluid located therein. The impingement of the hydraulic fluid on the piston that the piston is forced through in the cylinder 22 resists movement of the piston and acts to dampen movement of an associated vehicle spring.

The rod guide assembly 24 is secured in place using the snap ring closure system 10. The snap ring closure system 10 of the present invention includes a double-lobed groove 40 formed around the outer circumference of the rod guide 24, preferably relatively near an inner end 42 thereof. The double-lobed groove 40 includes an outer lobe 44 and an inner lobe 46. The outer lobe 44 is deeper than the inner lobe 46 and is shaped to receive a first snap ring 48 such that it is recessed below the outer surface 49 of the rod guide 25 when compressed. The first snap ring 48 is made of spring steel and has a circular cross-section. However, many kinds of durable, compressible, resilient materials, such as carbon steel, stainless steel, etc. would be operative and are considered within the scope of the invention. Furthermore, while a first snap ring 48 having a circular cross-section is preferred, snap rings having cross sections which are oval, triangular, trapezoidal, hexagonal or polygonal would be operative and are considered within the scope of the invention as well. The closure system 10 additionally includes an annular groove 50 formed in the interior wall of the cylinder 22. The annular groove 50 is positioned at a depth within the cylinder 22 such that when the rod guide 25 is inserted into the cylinder 22, the outer lobe 44 of the double-lobed groove 40 aligns with the annular groove.

The snap ring closure system 10 further includes a second snap ring 54. After the rod guide 24 is pulled outward of the cylinder 22 engaging the first snap ring 48 against the bottom lobe 46 of the double-lobed groove 40, the second snap ring 54 is expanded over the top 56 of the rod guide 24 and is received between the underside of the flange 32 and the top edge 52 of the cylinder 22. As with the first snap ring 48, the second snap ring is also preferably made of spring steel and is circular in cross-section. However, many other materials, such as carbon steel, stainless steel and other cross-sections, such as triangular, trapezoidal, rectangular, elliptical, polygonal, etc. are within the scope of the present invention.

Figure 3:
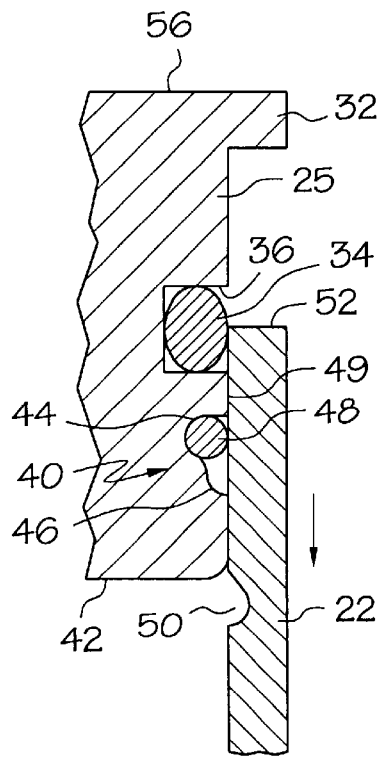
FIG. 3 is a detail side elevation in section of the snap ring closure system of FIG. 1, showing a beginning step of securing a hydraulic damper rod guide.
Figure 4:
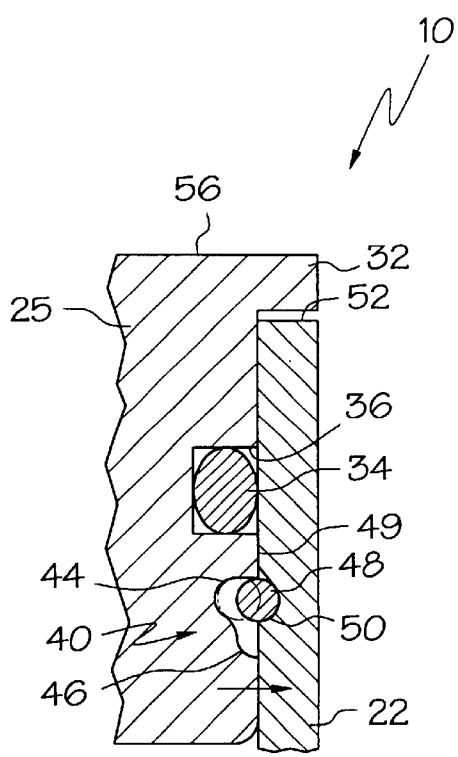
FIG. 4 is a detail side elevation in section of the snap ring closure system of FIG. 1, showing an intermediate step of securing a hydraulic damper rod guide.
Figure 5:
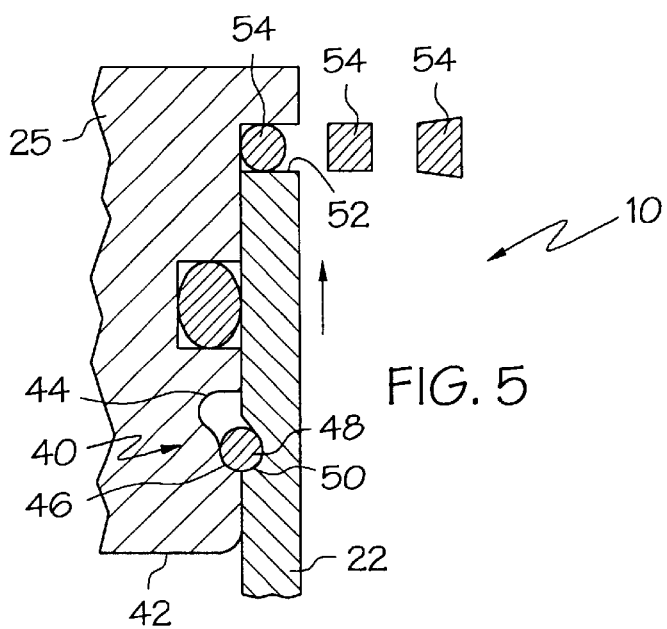
FIG. 5 is a detail side elevation in section of the snap ring closure system of FIG. 1, showing a final step of securing a hydraulic damper rod.

As best shown in FIGS. 3–5, the snap ring closure system 10 is utilized in the assembly of a hydraulic damper in the following manner. Initially, an end cap (not shown) is secured to the bottom of the cylinder 22 and the cylinder 22 is filled with hydraulic fluid (not shown). Next, as shown best in FIG. 3, a rod guide 24, having a piston rod 28 inserted therethrough, is inserted in the top of the cylinder 22. A first snap ring 48 is positioned within the outer lobe 44 of the double-lobed groove 40. The ring 48 is compressed into the lobe 44 and rod guide 24 is then pushed into the cylinder 22 until the first lobe 44 of the double-lobed groove 44 is aligned with the annular groove 50. At this point, as shown in FIG. 4, the snap ring 48 expand into the annular groove 50. Then, as shown in FIG. 5, the rod guide 24 is pulled slightly outwardly of the cylinder 22 until the engagement of the first snap ring 48 against the bottom lobe 46 of the double-lobed groove 44 prevents further outward movement of the rod guide 24. Finally, the second snap ring 54 is expanded over the top of the rod guide 24, and seated between the underside of the flange 32 and the top edge 52 of the cylinder 22. The placement of the second snap ring 54 thereby prevents inward movement of the rod guide 24 in the cylinder 22. The location of the annular groove 50 is critical because the first snap ring 48 must be able to decompress and engage the annular groove 50 when the top lobe 44 of the double-lobed groove 40 is aligned with the annular groove 50. Additionally, the positioning of both the double-lobed groove 40 and the annular groove 50 must be chosen so that the proper space is maintained between the underside of the flange 32 and the top edge of the cylinder 52 to receive the second snap ring 54. This is because the location of the second snap ring 54 on the underside of the flange 32 and the top edge of the cylinder prevents movement of the rod guide 24 inward of the cylinder 22.

What is claimed is:

1. A method for securing a cap member to a cylinder comprising the steps of:

selecting a cylindrical tube having an open end defined by an upper edge and an annular groove formed about an inner circumference of said cylindrical tube;

selecting an end cap having a cylindrical portion shaped to be received in said tube and including a flange shaped to extend radially over said upper edge, said end cap having a double-lobed groove in an outer circumference of said cylindrical portion said double-lobed groove having an outer lobe and an inner lobe positioned on said end cap member such that when said cap member is inserted in said tube, said outer lobe aligns with said annular groove;

selecting a first snap ring shaped to fit in said outer lobe of said double lobed groove;

selecting a second snap ring shaped to fit between an underside of said flange and said upper edge of said tube;

compressing said first snap ring into said outer lobe of said double-lobed groove and inserting said cap member into said cylinder to a depth such that said outer lobe of said groove is in alignment with said cylinder annular groove, thereby allowing said first snap ring to expand radially into said annular groove;

withdrawing said cap member from said tube until further outward progress of said cap member is prevented by engagement of the inner lobe of said double-lobed groove against the bottom of said first snap ring; and positioning said second snap ring between said cap member flange and said cylinder upper edge, whereby movement of said cap member into said cylinder is prevented by the engagement of said flange with an upper surface of said snap ring.

2. A snap ring closure system comprising:

a cylindrical tube having an open end defined by an upper edge, said tube having an annular groove formed in an inner circumference thereof spaced from said open end;

a cap member having a cylindrical portion shaped to be received by said tube and including a flange shaped to extend over said upper edge wherein an outer circumference of said cylindrical portion of said end cap includes a double-lobed groove with an outer lobe and an inner lobe having a lesser depth than said outer lobe;

a first snap ring shaped to fit in said outer lobe of said double-lobed groove and to protrude from said end cap when seated in said inner lobe; and a second snap ring shaped to fit between an underside of said flange and said upper edge of said tube, whereby said end cap is secured to said tube by engagement of said first snap ring with said annular groove when seated in said inner lobe and said second ring is positioned between said flange and said upper edge.

3. The snap ring closure system of claim 2 wherein said end cap is a rod guide for use in a hydraulic damper.

4. The snap ring closure system of claim 2 wherein said first snap ring has a circular cross-section.

5. The snap ring closure system of claim 2 wherein said second snap ring has a circular cross-section.

6. The snap ring closure system of claim 2 wherein said second snap ring has a trapezoidal cross-section.

7. The snap ring closure system of claim 2 wherein said second snap ring has a square cross-section.

8. The snap ring closure system of claim 2 further including a seal positioned between said first snap ring and said second snap ring to prevent leakage of hydraulic fluid from said cylinder.

9. The snap ring closure system of claim 8 wherein said seal is an O-ring.

10. The snap ring closure system of claim 2 wherein said flange is unitary with said end cap.

* * * * *